June 21, 1938.  R. H. CURRIE  2,121,686
METHOD OF MAKING HOT-BLAST VALVE SEATS
Filed Aug. 24, 1934   2 Sheets-Sheet 1
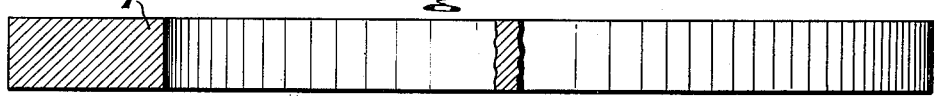
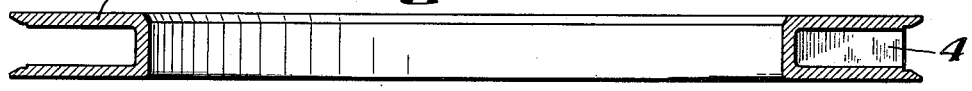
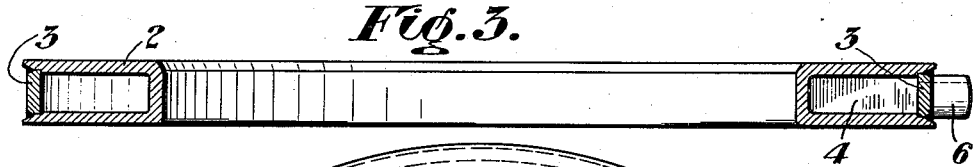
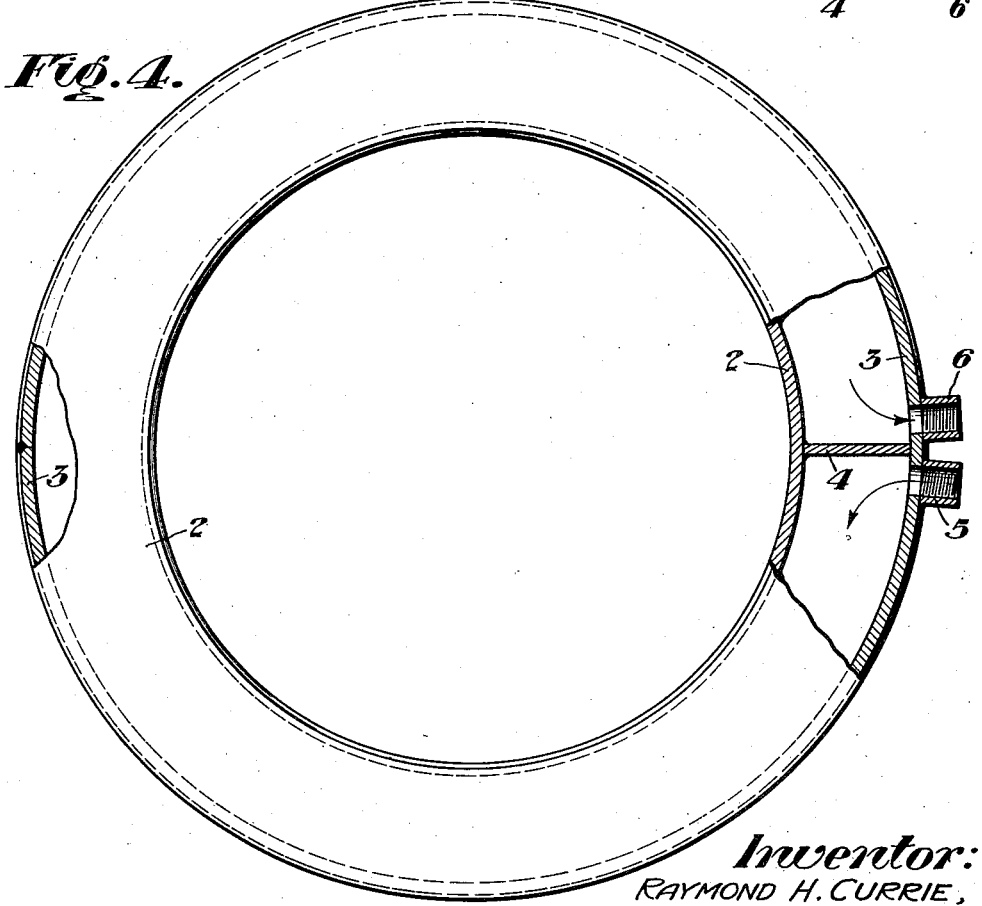
Inventor:
RAYMOND H. CURRIE,
by Usina & Rauber
his Attorneys.

June 21, 1938.　　　R. H. CURRIE　　　2,121,686
METHOD OF MAKING HOT-BLAST VALVE SEATS
Filed Aug. 24, 1934　　　2 Sheets-Sheet 2
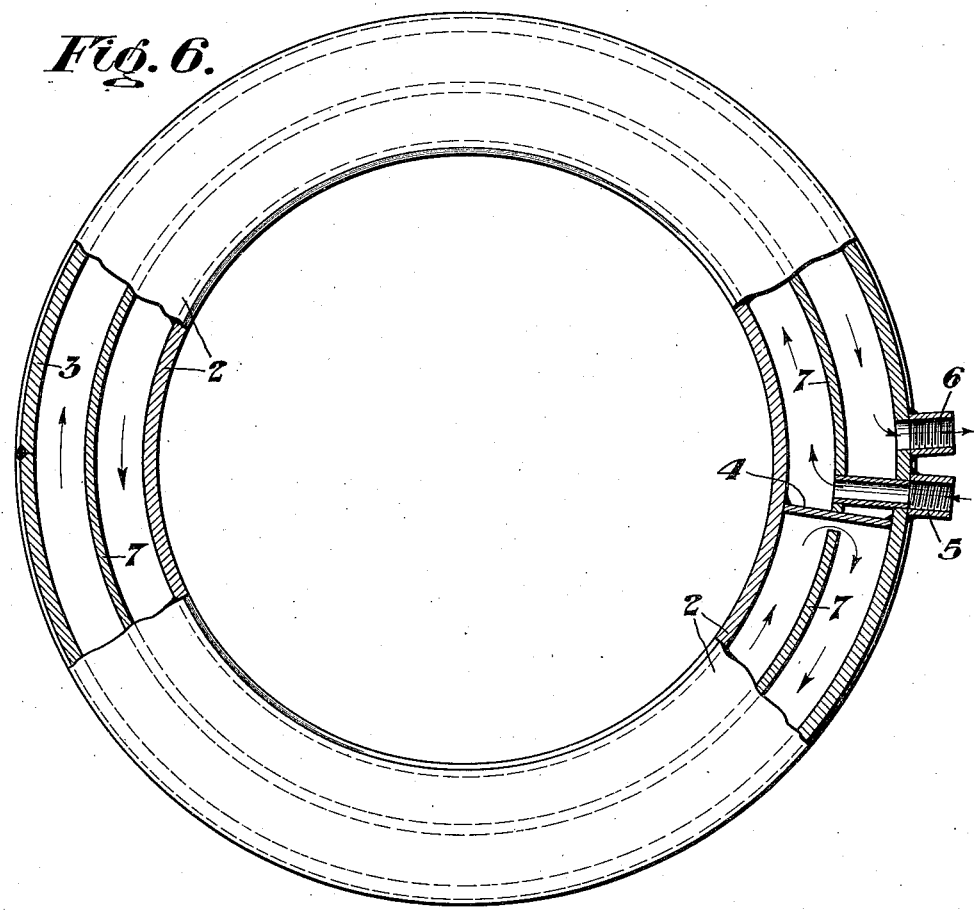
Inventor:
RAYMOND H. CURRIE,
by: Usina & Rauber
his Attorneys.

Patented June 21, 1938

2,121,686

UNITED STATES PATENT OFFICE 2,121,686

METHOD OF MAKING HOT-BLAST VALVE SEATS

Raymond H. Currie, Duquesne, Pa.

Application August 24, 1934, Serial No. 741,321

2 Claims. (Cl. 29—157.1)

This invention relates to hot-blast valve seats, it being understood that a hot-blast valve is of the mushroom or poppet type and that its seat is in the form of a ring which is clamped between tubular sections of the valve body so that its inner peripheral portions are directly contacted by the hot-blast, and that it is consequently necessary that this ring be hollow so that it may be water-cooled. One of the objects is to provide a hot-blast valve seat made from rolled metal, which is improved over those now manufactured in that the pounding of the valve does not cause it to leak prematurely and in that the hot-blast does not unduly warp it. Other objects may be inferred.

Referring to the accompanying drawings:—

Figures 1, 2, and 3 are sectional views of a hot-blast valve seat during various stages of its making.

Figure 4 is a top partially sectioned view of Figure 3.

Figure 5 is a sectional view of a modification of the valve seat illustrated by the first four figures.

Figure 6 is a top partially sectioned view of this modification.

The method of making the seat illustrated by the drawings includes forming a ring 1 from a solid piece of rolled metal, which may be done by cutting the ring from a solid steel slab of a thickness slightly greater than that of the ring desired. Metal is then removed from the ring by way of its outer circumferential surface so as to form an outwardly facing channel ring 2 whose walls are integral throughout and are of substantially equal thicknesses. This metal may be removed by a rough machining operation.

A metal ring 3 is then fastened to the channel ring 2 so as to close its face and thereby form an enclosure which may receive cooling fluid. Prior to this a partition 4 is arranged to divide the space within the channel ring 2. The provision of an inlet and outlet 5 and 6 through the ring 3, arranged to introduce and remove cooling fluid to and from the channel ring 2 on opposite sides of the partition 4, completes the fabrication of the seat, excepting that the upper and lower surfaces of the channel ring 2 are machined to provide a suitable finish so that the seat may be clamped between the valve body sections in the usual manner and so that the valve may properly seat. The resulting structure is then carefully annealed to remove internal strains, the seat being then ready for use.

It is to be noted that the resulting seat is better than other known rolled steel seats in that its portions which are normally contacted by the hot-blast, are free of internal strains because of the fact that they are not fabricated by bending or welding operations, but are integral and free of joints. Since the walls of the channel ring 2 are of substantially equal thicknesses, there is no tendency for unequal expansion of the seat to occur when heated. Any slight strains introduced by the machining operations are removed when the seat is annealed.

The modification is made in the same manner as has already been described, excepting that a circumferential baffle 7 is arranged within the channel ring 2 so as to divert cooling fluid passing therethrough into oppositely moving circumferential flows. This baffle not only tends to increase the cooling effect of the fluid introduced to the seat but also functions as an internal brace which supports the upper and lower walls of the seat.

The ring 3, partition 4 and baffle 7 are all made from rolled metal, such as steel bars, and are welded into place.

I claim:

1. A method of making a hot-blast valve seat, including forming a ring from a solid piece of rolled metal, removing metal from said ring by way of its outer circumferential surface so as to form an outwardly facing channel ring whose walls are integral throughout and are of substantially equal thicknesses, and fastening a metal ring to said channel ring so as to close its face and to thereby form an enclosure which may receive cooling fluid.

2. A method of making a hot-blast valve seat, including forming a ring from a solid piece of rolled metal, removing metal from said ring by way of its outer circumferential surface so as to form an outwardly facing channel ring whose walls are integral throughout and are of substantially equal thicknesses, fastening a metal ring to said channel ring so as to close its face and to thereby form an enclosure which may receive cooling fluid, and annealing the resulting structure to remove internal strains.

RAYMOND H. CURRIE.